United States Patent [19]
Ng

[11] Patent Number: 4,752,388
[45] Date of Patent: Jun. 21, 1988

[54] UNDERGRAVEL FISHTANK FILTER

[76] Inventor: Ying Y. Ng, House A-3, Stanley Knoll, 42 Stanley, Village Rd., Hong Kong, Hong Kong

[21] Appl. No.: 864,790

[22] Filed: May 19, 1986

[51] Int. Cl.⁴ .................... B01D 23/10; B01D 27/08; B01D 29/36
[52] U.S. Cl. .................................. 210/169; 210/266; 210/416.2; 119/5
[58] Field of Search ................ 119/5; 210/169, 416.2, 210/232, 195.1, 266, 258, 283, 335, 336

[56] References Cited

U.S. PATENT DOCUMENTS

| | | | |
|---|---|---|---|
| 3,487,440 | 12/1969 | Newsteder | 119/5 |
| 3,490,416 | 1/1970 | Kelley et al. | 119/5 |
| 3,512,646 | 5/1970 | Willinger | 119/5 |
| 3,516,544 | 6/1970 | Sesholtz | 119/5 |
| 3,557,753 | 1/1971 | Dantoni | 119/5 |
| 3,624,777 | 11/1971 | Gardner | 119/5 |
| 3,720,318 | 3/1973 | Cohen | 119/5 |
| 4,035,298 | 7/1977 | Cloke et al. | 210/169 |
| 4,098,230 | 7/1978 | Jackson | 119/5 |
| 4,268,387 | 5/1981 | Hall | 210/169 |
| 4,556,485 | 12/1985 | Ogawa | 210/169 |

FOREIGN PATENT DOCUMENTS

| | | | |
|---|---|---|---|
| 152670 | 8/1985 | European Pat. Off. | |
| 2416365 | 10/1975 | Fed. Rep. of Germany | 119/5 |
| 2809129 | 9/1979 | Fed. Rep. of Germany | 119/5 |
| 453843 | 6/1913 | France | 119/5 |
| 2285808 | 5/1976 | France | 119/5 |
| 1208994 | 10/1970 | United Kingdom | |

Primary Examiner—Richard V. Fisher
Assistant Examiner—Wanda L. Millard
Attorney, Agent, or Firm—Leydig, Voit & Mayer

[57] ABSTRACT

An inlet conduit in the form of a rigid, perforated support for gravel in the base of a fishtank is communicatively connected to a chamber having a first portion housing filter means and two second portions on opposite sides of the filter means. A tube formed with apertures throughout its entire length extends longitudinally across the lower end of a convergent nozzle which has an elongate cross-section and extends upwardly from the filter means. The tube is supplied with pressurized air through a hose and, as a result, air bubbles issue at a uniform rate across the whole width of the nozzle and, as these bubbles pass upwardly through the nozzle, induce flow of water through the gravel, through slots formed in the inlet conduit, and through filtering material enclosed in the filter means to thereby clean the water drawn through the nozzle.

5 Claims, 6 Drawing Sheets

UNDERGRAVEL FISHTANK FILTER

FIELD OF THE INVENTION

The invention relates to a filter for cleaning the water in a fishtank and, in particular, to a filter in which the water is sucked through gravel in the base of the fishtank, passed through filtering material and then fed back into the main body of water within the fishtank.

BACKGROUND ART

Known fishtank filters comprise filter means and drive means for causing water to flow through the filter means. However, these known filters are inefficient in that water which has been filtered is mixed immediately with unfiltered water and a large proportion of this filtered water is recirculated to the filter means together with unfiltered water.

DISCLOSURE OF THE INVENTION

It is the purpose of the present invention to provide an undergravel fishtank filter in which water in the fishtank is circulated through the filter in such a way that unfiltered water is drawn from the base of the fishtank, filtered and then returned to the mass of water disposed above the base of the fishtank.

This is achieved by providing an inlet conduit for disposition below gravel in the fishtank for the purpose of transferring water within the fishtank to the filter means.

Thus, according to the invention, there is provided an undergravel fishtank filter comprising filter means; an inlet conduit for disposition below gravel in a fishtank and for the purpose of transferring water within the fishtank to the filter means; and drive means for causing water from the inlet conduit to flow through the filter means.

By this means, it is possible to withdraw water to be filtered from the base of the fishtank and to return the filtered water to the fishtank at a level above the base.

In a preferred embodiment of the invention, the inlet conduit is in the form of a rigid support for gravel and perforations are provided in this support for the flow of water through the gravel and into the inlet conduit. This ensures that water to be filtered can be withdrawn uniformly from spaced parts of the base of the fishtank. Moreover, the water withdrawn from the base of the fishtank is passed first through the gravel resting on the inlet conduit, to filter out part of the impurities, such as particulate material, from the water before the water is passed through the filter means.

The inlet conduit may conveniently comprise two or more detachably connectable portions so that the number of portions disposed in a fishtank can be varied in accordance with the size of the fishtank so that the inlet conduit covers substantially whole of the base of the fishtank. Alternatively, the inlet conduit may be a single part.

In the practical embodiment of the invention, a chamber, communicatively connected to the inlet conduit, is provided for housing the filter means; the drive means comprise a convergent nozzle extending upwardly from the chamber and an air bubble dispensing device; the convergent nozzle has a lower end communicatively connected to the chamber and an upper end of smaller cross-section than the lower end; and the air bubble dispensing device is disposed within or below the lower end of the convergent nozzle. Compressed air fed into the air bubble dispensing device issues in the form of bubbles which induce the flow of water from the inlet conduit, through the filter means, and out of the convergent nozzle back into the body of the water within the fishtank.

Advantageously, the chamber has a first portion for accommodating the filter means and at least one second portion, adjacent the first portion; and a second aperture in the chamber, opening into each second portion and provided with a removable closure. By this means, it is possible to ensure that large particulate material accumulating in the second portion of the chamber may be sucked out of each second portion of the chamber through the second aperture after removal of the closure.

The convergent nozzle is preferably of elongate rectangular horizontal section and the air bubble dispensing device may then be provided in the form of a rectilinear, randomly apertured tube extending along the longitudinal of the axis of the lower end of the convergent nozzle. This ensures that filtered water is fed back into the body of water within the fishtank over a wide area.

The tube is preferably formed with apertures throughout its entire length so as to ensure the formation of bubbles at random across the whole width of the nozzle.

In another preferred embodiment of the invention, the convergent nozzle comprises a fixed front wall and two fixed end walls, and a rear wall pivotally mounted for opening and closing movement about an axis extending parallel to the longitudinal extent of the lower end of the convergent nozzle; two arcuate slots are formed respectively in the end walls; and the apertured tube is attached to the rear wall and extends through the two arcuate slots.

In this way, it is possible to rotate the rear wall about an axis extending parallel to the longitudinal extent of the lower end of the convergent nozzle and thus slide the apertured tube, which is attached to the rear wall, along the two arcuate slots, to leave a wide opening for removing cartridges of filtering material. Therefore, the filtering material can be replaced without disturbing the nozzle or the inlet conduit in the base of the tank.

The upper end of the convergent nozzle may be provided with an apertured cover which is hingedly connected to the fixed front wall of the nozzle in order to allow for the opening movement of the rear door and to filter out any impurities which may have escaped from the filter means before returning the filtered water to the fishtank.

Two embodiments of the invention are hereinafter described, by way of examples, with reference to the accompanying drawings.

MODE FOR CARRYING OUT THE INVENTION

Figure 1:
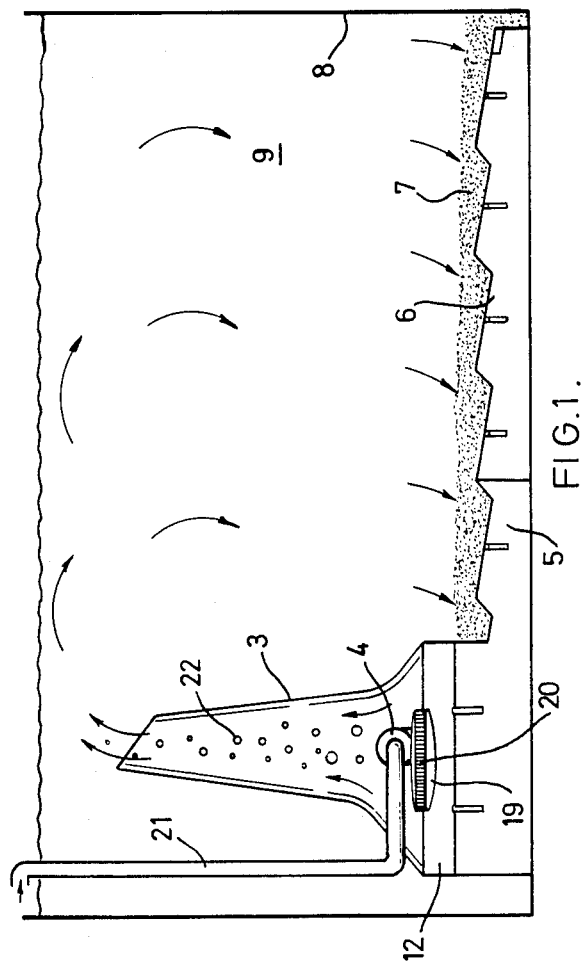
FIG. 1 is a side elevation of a fishtank provided with an undergravel fishtank filter in accordance with the first embodiment of the present invention.

As shown in FIG. 1, a filter according to the first embodiment of the invention is positioned within a fishtank 8 containing water 9. Compressed air is fed through a hose 21 into a plastic tube 4 formed with randomly spaced apertures 43 causing a stream of bubbles 22 to rise through a convergent nozzle 3. This induces a flow of water 9 through gravel 7, through apertures (not shown) in an inlet conduit 5 and 6 supporting the gravel 7, and through filter means (not shown) disposed below the nozzle 3.

Figure 2:
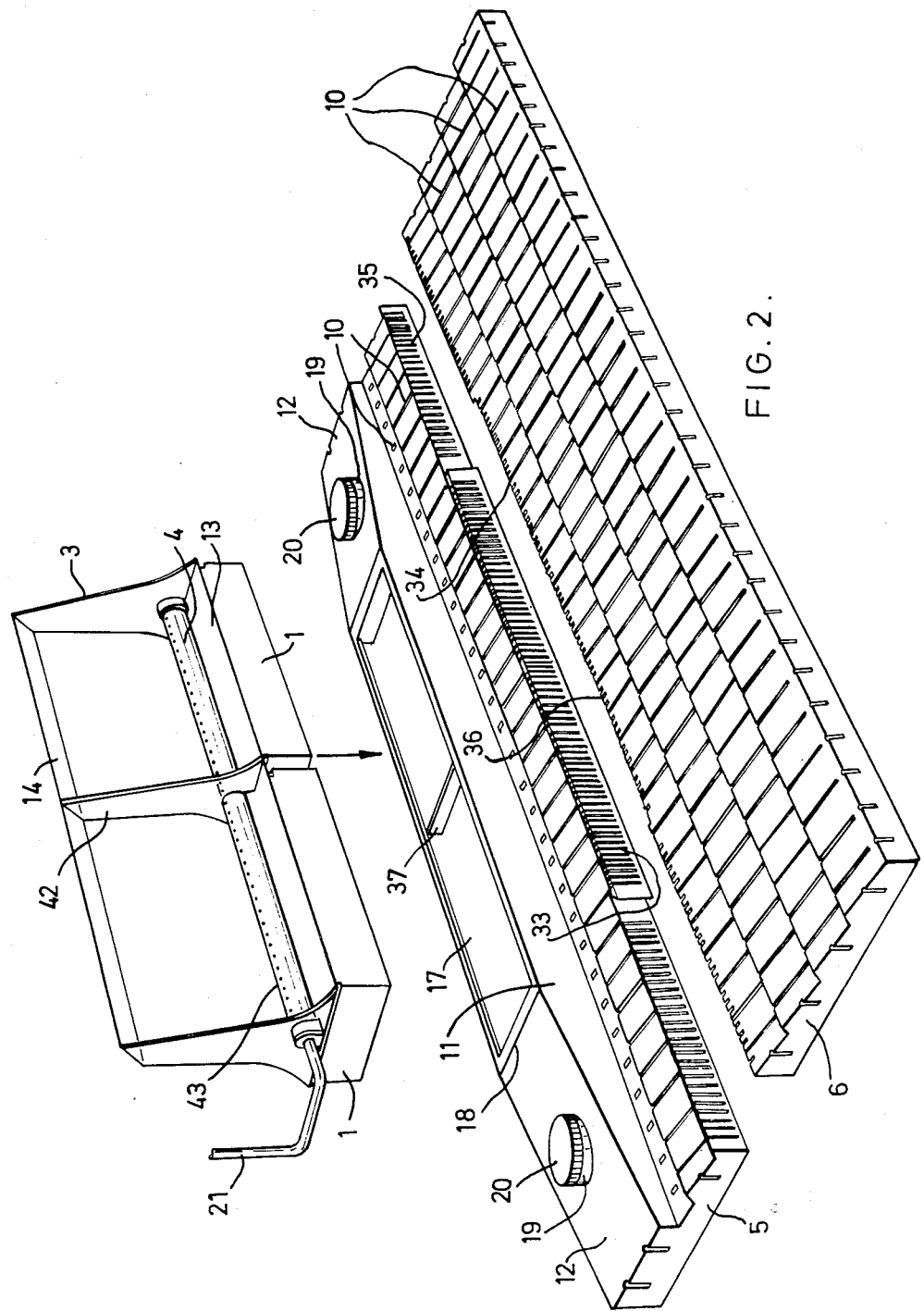
FIG. 2 is an exploded isometric view of the filter shown in FIG. 1.

As shown in FIG. 2, the apertures formed in the inlet conduit 5 and 6 comprise slots 10. As also shown, part 5 of the inlet conduit is formed with a dove-tail projection 33 for making engagement with a dove-tail recess 34 in part 6 of the inlet conduit. These parts 5 and 6 of the inlet conduit are communicatively connected by means of slots 35 formed in the part 5 and in similar slots 36 formed in the part 6 of the inlet conduit.

As also shown in FIG. 2, the inlet conduit 5 and 6 is communicatively connected to a chamber having a central first portion 11 and two second portions 12 disposed on opposite sides of the first portion 11. The first portion 11 is formed with a rectangular aperture 17 for receiving two containers 1 for filtering material (not shown) supported by the convergent nozzle 3. The two containers 1 are disposed on opposite sides of a reinforcing member 37 disposed within the first portion 11 of the chamber 11 and 12. The nozzle 3, which is formed of transparent plastic material, has a central stiffener 42 and has an elongate rectangular cross-section and the tube 4 is aligned with the longitudinal axis of the lower end 13 of the nozzle 3 so as to provide a relatively wide flow of bubbles 22 and resultant flow of water 9 through the upper end 14 of the nozzle 3.

Figure 3:
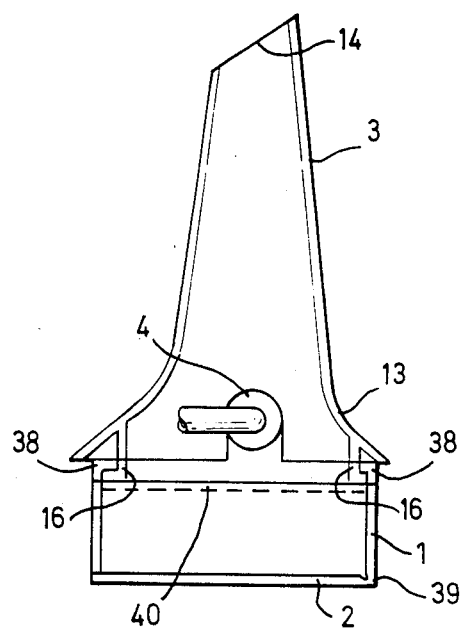
FIG. 3 is a sectional side elevation of part of the filter shown in FIGS. 1 and 2.
Figure 4:
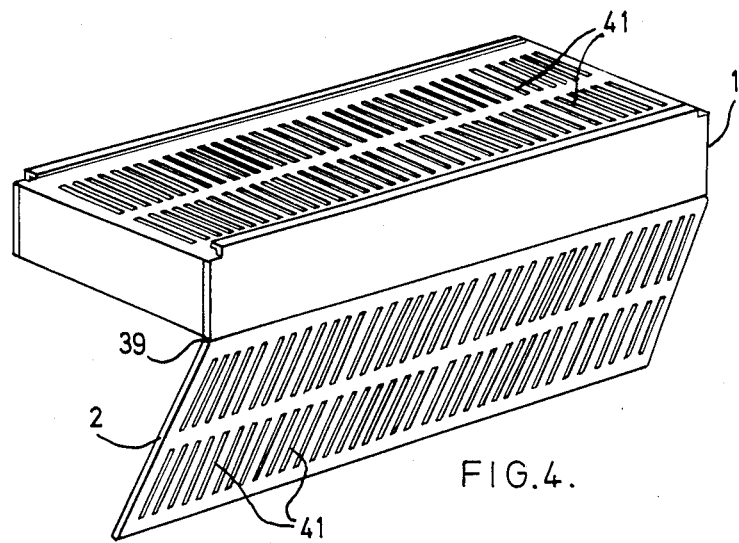
FIG. 4 is an isometric view of filter means forming part of the apparatus shown in FIGS. 1 to 3.

As shown in FIG. 3, angle-section portions 16 extend from the lower end 13 of the nozzle 3 to engage slide members 38 formed on each container 1 so that each container 1 may be slidably engaged with and disengaged from the nozzle 3. As shown more clearly in FIG. 4, each container 1 has a bottom side 2 which can be opened and closed on movement about hinges 39 formed by a reduced thickness interconnection between the bottom side 2 and the adjacent side of the container 1 and may be releasably locked in its closed position by fastening means (not shown). The top and bottom sides 2 and 40 of the container 1 are also formed with slotted apertures 41 to permit water 9 to flow through the container 1.

Figure 5:
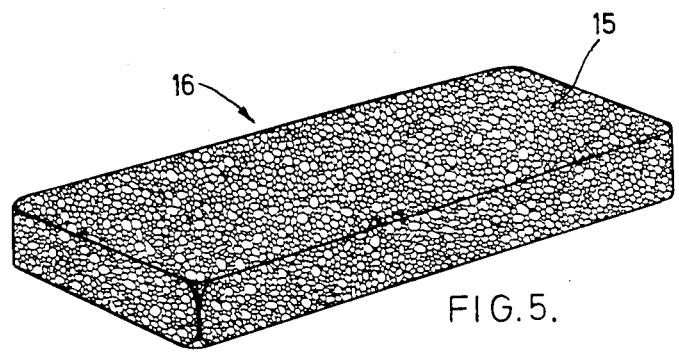
FIG. 5 is an isometric view of a pre-formed pad of filtering material for insertion in the filter means shown in FIG. 4.

The container 1 is normally filled with porous material such as carbon, cotton wool, or glass wool or fabric material impregnated with carbon to catch impurities such as particulate material and dissolved ammonia, but this filtering material 15 may be provided as a preformed pad 16, as shown in FIG. 5.

To remove large particulate material accumulating in the second portions 12 of the chamber 11 and 12, closure caps 20 may be removed from second apertures 19 formed in the second portions so as to permit the insertion of suction tubes into this second portion for the removal of large particulate material within the second portions 12.

Figure 6:
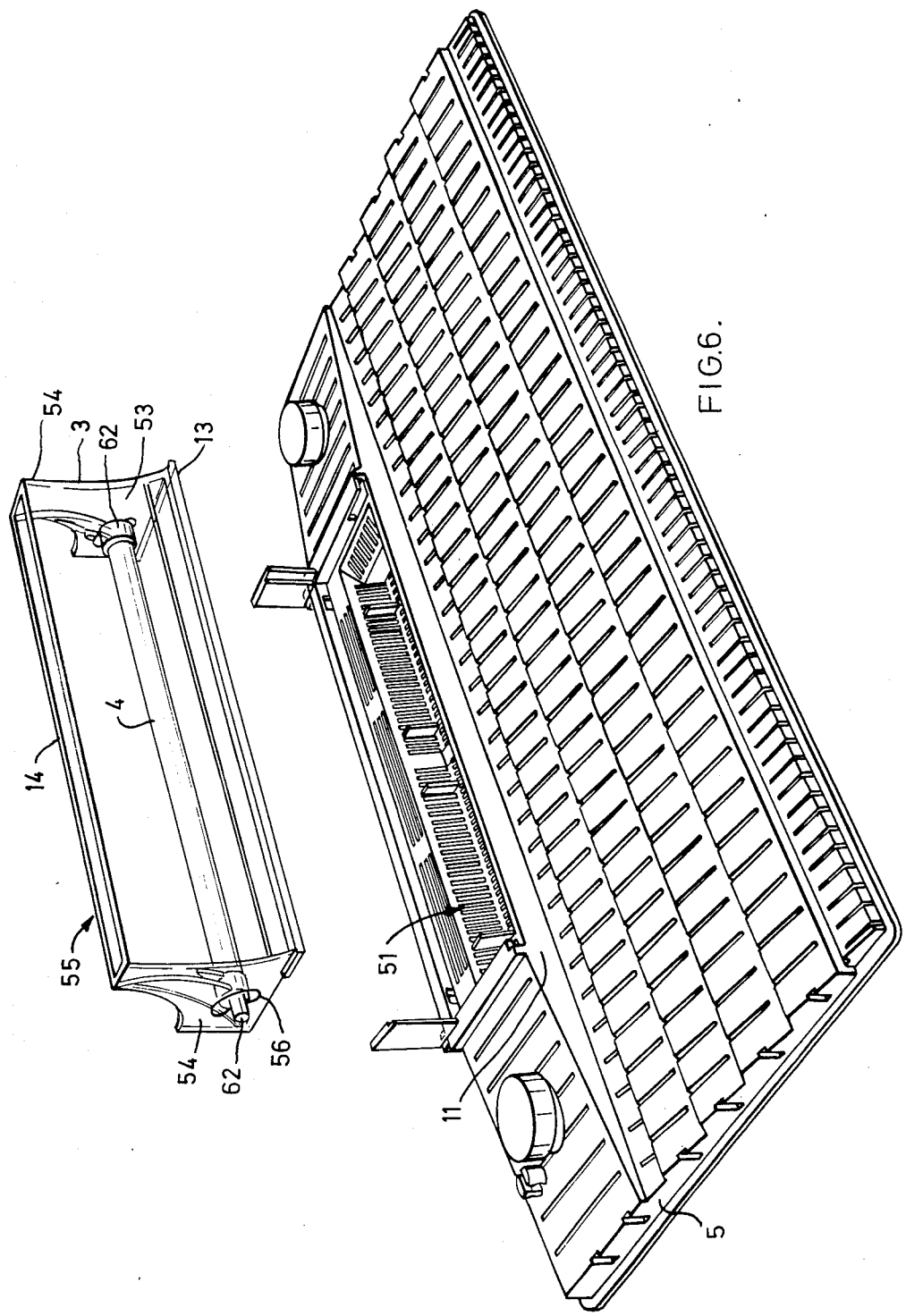
FIG. 6 is an exploded isometric view of an undergravel fishtank filter in accordance with the second embodiment of the present invention, showing the nozzle separated from the inlet conduit.
Figure 7:
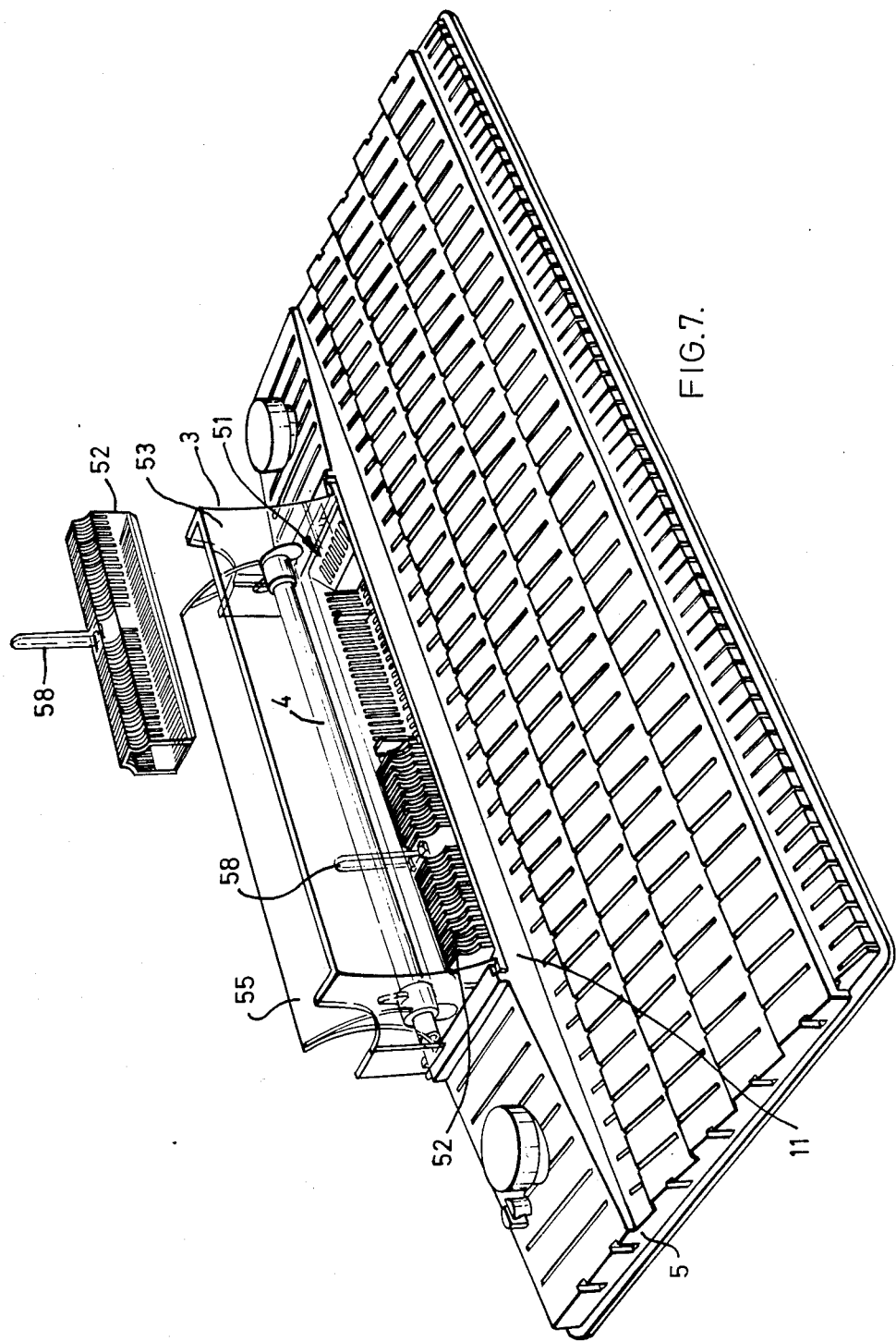
FIG. 7 is an exploded isometric view of the filter shown in FIG. 6, showing the nozzle open and connected to the input conduit, and showing one filter cartridge in place and the other separated from the nozzle and the inlet conduit.

FIGS. 6 and 7 show a second embodiment of a filter according to the present invention. This embodiment has a similar mechanism for filtering impurities in a fishtank. However, as illustrated in FIG. 6, the convergent nozzle 3 comprises a fixed front wall 53, two fixed end walls 54, and a rear wall 55 pivotally mounted for movement about an axis extending parallel to the longitudinal extent of the lower end 13 of the convergent nozzle 3. Two arcuate slots 56 are formed respectively in the end walls 54 and the apertured tube 4 is snap-fittably connected to brackets 62 which are formed integrally with the rear wall 55 and extends through the two arcuate slots 56.

If desired, the upper end 14 of the convergent nozzle 3 may be provided with an apertured cover which is hingedly connected to the fixed front wall 53 of the convergent nozzle 3.

As shown in FIG. 7, the filter means differ also from that of the first embodiment in that they comprise two disposable cartridges 52 accommodating filtering material (not shown) removably seated in an apertured cradle 51 formed in the first portion 11 of inlet conduit 5. As shown each container 52 has two lifting members 58 and all of its faces are slotted to permit water 9 to flow therethrough.

In this embodiment the inlet conduit 5 is formed as a single part, and the convergent nozzle 3 is a slidable fit on the inlet conduit 5.

FIG. 6 shows the rear wall 55 of the convergent nozzle 3 in a closed operative position, whilst FIG. 7 shows the rear wall 55 in an open position. In this latter position the apertured tube 4 is moved to the rear thus providing a wide opening so that the cartridges 52 can be lifted out of the nozzle 3 by the lifting members 58.

The parts of the filter of the embodiments of FIGS. 1 to 4 and 6 and 7, namely the inlet conduit, nozzle and container or cartridge for filter material may each be formed of plastics material such as polycarbonate.

I claim:

1. An undergravel fishtank filter comprising an inlet conduit for disposition below gravel in a fishtank, a chamber in communication with the inlet conduit and housing filter means in the form of a removable cartridge, a convergent nozzle extending upwardly from the chamber and having an elongated rectangular horizontal cross-section, a lower end of the convergent nozzle being connected to the chamber and the upper end being of smaller cross-section than the lower end, an air bubble dispensing device disposed at or adjacent to the lower end of the convergent nozzle, the air bubble dispensing device comprising a rectilinear apertured tube extending along or parallel to the longitudinal extent of the lower end of the convergent nozzle, wherein the convergent nozzle comprises a fixed front wall and two fixed end walls projecting upwardly from the chamber, a rear wall pivotally mounted for opening and closing movement about an axis extending parallel to the longitudinal extent of the lower end of the convergent nozzle to allow removal of the cartridge through the nozzle, two arcuate slots being formed respectively in the end walls, and the apertured tube being attached to the rear wall and extending through the two arcuate slots.

2. A filter according to claim 1, wherein the upper end of the convergent nozzle is provided with an apertured cover which is hingedly connected to the fixed front wall of the convergent nozzle.

3. A filter according to claim 1, wherein the chamber accommodates two of said removable cartridges.

4. A filter according to claim 1, wherein said filter including a removable means comprising a lifting member for manual lifting of the cartridge from the chamber when the rear wall is opened.

5. A filter according to claim 1, wherein the chamber comprises a first portion accommodating the filter means and a second portion adjacent to the first portion, said second portion defining an aperture having a removable closure.

* * * * *